United States Patent [19]
Tsuchinari et al.

[11] Patent Number: 5,559,064
[45] Date of Patent: Sep. 24, 1996

[54] CHROME-FREE BRICK

[75] Inventors: Akihiro Tsuchinari; Hiroaki Osaki; Hisato Okamoto; Tetsuo Yamamoto, all of Takasago, Japan

[73] Assignee: Harima Ceramic Co., Ltd., Hyogo, Japan

[21] Appl. No.: 360,819

[22] PCT Filed: Nov. 9, 1994

[86] PCT No.: PCT/JP94/01892

§ 371 Date: Dec. 30, 1994

§ 102(e) Date: Dec. 30, 1994

[87] PCT Pub. No.: WO95/15932

PCT Pub. Date: Jun. 15, 1995

[30] Foreign Application Priority Data

Dec. 9, 1993 [JP] Japan .................................. 5-341365
Feb. 9, 1994 [JP] Japan .................................. 6-037620
Mar. 8, 1994 [JP] Japan .................................. 6-065512

[51] Int. Cl.⁶ .......................... C04B 35/03; C04B 35/04; C04B 35/52

[52] U.S. Cl. .......................... 501/120; 501/100; 501/101; 501/108

[58] Field of Search .................................. 501/120, 100, 501/101, 108

[56] References Cited

U.S. PATENT DOCUMENTS

| | | | |
|---|---|---|---|
| 3,316,108 | 4/1967 | Blomberg .................... | 501/120 |
| 4,306,030 | 12/1981 | Watanabe et al. ............ | 501/99 |
| 4,957,887 | 9/1990 | Michael et al. ............... | 501/101 |
| 5,007,615 | 4/1991 | Kernion et al. ............... | 251/368 |
| 5,021,374 | 6/1991 | Macey ............................ | 501/120 |
| 5,171,724 | 12/1992 | Iwadoh et al. ................ | 501/120 |
| 5,250,479 | 10/1993 | Rancoule et al. ............. | 501/120 |
| 5,418,199 | 5/1995 | Knauss ........................... | 501/120 |

FOREIGN PATENT DOCUMENTS 52-142708  11/1977  Japan.
59-141461  8/1984  Japan.

OTHER PUBLICATIONS

W. D. Kingery, H. K. Bowen, and D. R. Uhlmann, Introduction to Ceramics 2nd Edition (1976), pp. 6 and 7.
English translation of JP 59-141,461.
Abstract of JP 52-142,708.
Abstract of JP 4-238,855.

*Primary Examiner*—Mark L. Bell
*Assistant Examiner*—Louis M. Troilo
*Attorney, Agent, or Firm*—Millen, White, Zelano, & Branigan, P.C.

[57] ABSTRACT

Chrome-free bricks which exhibit excellent resistance to corrosion, penetration, and thermal spalling. The bricks are mainly made from a magnesia material and/or a magnesia-alumina spinel material and comprise 1 to 10 wt % titania and 1 to 15 wt % alumina. They may contain 0.5 to 10 wt % iron oxide. Further, they may contain at least one material of the group consisting of 1 to 10 wt % metal powder, 1 to 20 wt % carbon and 1 to 20 wt % one of oxide materials except for iron oxide.

18 Claims, No Drawings

CHROME-FREE BRICK

TECHNICAL FIELD

The present invention relates to chrome-free bricks, and in particular, to chrome-free bricks well suited for use as lining material lined on the inner surfaces of furnaces or vessels for steel-making, cement kilns and glass fusion furnaces, which are directly exposed to high temperatures.

BACKGROUND ART

Magnesia brick has been widely used as lining material because it has a high melting point and superior resistance to corrosion caused by a basic slag. Magnesia brick however is not resistant to structural spalling, and therefore there has been proposed magnesia-chrome brick in order to prevent the break-up caused by structural spalling. The major raw materials of magnesia-chrome brick are magnesia material and chromite. Magnesia-chrome brick is very resistant to corrosion and heat spalling in addition to structural spalling.

In recent years, it has been reported that the intake, inhalation or contact with large amounts of chrome causes a human body rhinitis, dermatitis, bronchitis etc. which are typical diseases caused by hexavalent chromium. Diseases caused by chrome(VI) are of a seriousness such that they have become an object of public concern. For these reasons, the waste of brick made from chromite or chromium oxides is difficult to dispose when considering environmental problems and therefore, there is a strong demand for the development of brick which does not contain chrome, that is, "chrome-free brick".

Thus, the prime object of this invention is to provide chrome-free brick which does not contain chrome and exhibits superior resistance to structural spalling, corrosion and heat spalling although it does not contain chrome.

DISCLOSURE OF THE INVENTION

After a number of experiments, we have found that the penetration of slag and molten steel can be prevented without increasing the densification of brick and, therefore the corrosion and structural spalling resistances of brick can be increased, by allowing adequate amounts of titania and alumina to be added in a composition which is mainly composed of a magnesia material and/or a magnesia-alumina spinel material and by adjusting pore diameter and reaction products by the reaction to be described later. With this fact, we have made the present invention.

Chrome-free bricks according to the invention are mainly made from a magnesia material and/or a magnesia-alumina spinel material and contain 1 to 10% by weight of titania and 1 to 15% by weight of alumina.

Titania $TiO_2$ and alumina $Al_2O_3$ are used mainly as matrix additives for accelerating reactions. The following are the basic reactions at high temperature, where a mixture of the matrix additives and a magnesia material and/or a magnesia-alumina spinel material is used, kneaded, molded and burned, and where they are used without the burning.

When titania $TiO_2$ and alumina $Al_2O_3$ are added to magnesia and the mixture is burned, the following reactions occur:

  (1)
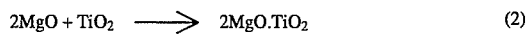  (2)

  (3)

As a result of the above reactions, the following product is formed.

$[MgO.Al_2O_3—2MgO.TiO_2]$ s.s.         (s.s.=solid solution)

When titania $TiO_2$ and alumina $Al_2O_3$ are added to a magnesia-alumina spinel, the following reactions occur:

  (4)
  (5)
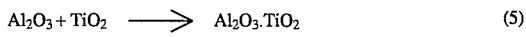  (6)
  (7)
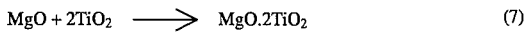  (8)

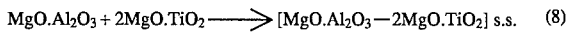

  (9)

(s.s. = solid solution)

As a result of the above reactions, a solid solution composed of $MgO.Al_2O_3$ and $2MgO.TiO_2$ and a solid solution composed of $Al_2O_3.TiO_2$ and $MgO.2TiO_2$ are formed.

The feature of the invention resides in the formation and presence of $[MgO.Al_2O_3—2MgO.TiO_2]$ s.s. which is the main reaction product formed in accordance with the above reaction. This main reaction product is formed on the surfaces of the particles of the magnesia material and magnesia-alumina spinel material which are the main raw materials working mainly as an aggregate, or produced in their matrix.

Hair cracks due to expansion and shrinkage occur at the boundary between the main reactive product and the particles of the aggregate, and besides, the main reactant product moves into the clearances formed between the aggregate particles, filling the clearances with the product, so that the pores are allowed to have a small diameter and complicated shape without increasing the densification of the chrome-free bricks so much.

The generation of hair cracks improves the resistance of the bricks to heat spalling. Since the pores are allowed to have a small diameter and complicated shape without increasing the densification of the chrome-free bricks, the penetration of slag and molten steel can be prevented. Further, since the densification of the chrome-free bricks does not increase so much, expansion and contraction are absorbed resulting in an increase in the structural spalling resistance. Note that if the densification increases to more than a certain extent, the structural spalling resistance will drop.

In cases where the chrome-free bricks according to the invention contain iron oxide, there are formed a solid solution of [Mg, Al, Fe, Ti] or a kind of composite spinel in which magnesia ferrite ($MgO.Fe_2O_3$) forms a solid solution together with titania $TiO_2$ and alumina $Al_2O_3$. This increases not only strength at high temperature, but also hydration resistance. More specifically, the chrome-free bricks containing iron oxide have longer durability than the conventional magnesia-chrome bricks and the spinel chrome-free bricks used in cement kilns.

The chrome-free bricks according to the invention may contain at least one further component selected from the group consisting of 1 to 10% by weight of metal powder, 1 to 20% by weight of carbon and 1 to 20% by weight of one of oxide materials except for iron oxide.

Of these additives, metal powder and oxide materials not only act as sintering aids for improving strength but also form a composite spinel represented by, for example, (Fe, Mg)O.(Al, Fe)$_2$O$_3$ which prevents the penetration of slag and molten steel, resulting in an increase in the corrosion resistance. By the use of carbon, the penetration of slag and molten steel can be also prevented, leading to an increase in the corrosion resistance.

The chrome-free bricks of the invention are used as sintered bodies or as unsintered bodies whose heat generated in service is utilized, but they are preferably used as unsintered bodies, when carbon is contained.

In order to achieve good moldability, clay may be added to the chrome-free bricks of the invention.

The chrome-free bricks of the invention having the above-described features do not cause problems such as environmental pollution and exhibit superior resistance to corrosion, structural spalling and heat spalling, although they do not contain chrome. Thanks to their long durability, the used quantity of the raw materials is lowered, which contributes to saving of resources. Further, the chrome-free bricks of the invention can be used as sintered bodies and as unsintered bodies.

The above-mentioned components of the chrome-free bricks of the invention will be described in detail.

As the magnesia material, magnesia-alumina spinel material and alumina that are used in the invention, one or more selected from sintered products and fused products made from natural materials or artificial materials may be used. Purity does not particularly affect the effect of the invention, but it is preferable to use materials having a purity of 95% or more, that is, materials containing few impurities. In order to ensure a close-packed structure, the grain size of the chrome-free bricks of the invention is preferably similar to that of the conventional magnesia bricks. Particularly, coarse particles are 5 to 1 or 3 to 1 mm, medium particles 1 to 0.05 mm, and fine particles 0.05 mm or less.

Titania TiO$_2$ used in the invention may be of rutile type or anatase type. It is also possible to use both types in combination. The titania TiO$_2$ content is preferably 1 to 10% by weight. If the titania content is less than 1% by weight, [MgO.Al$_2$O$_3$—2MgO.TiO$_2$] s.s. will be produced in a small amount so that it becomes more difficult to achieve the benefits of a small pore diameter and complicated pore shape. If the titania content exceeds 10% by weight, the amount of the product of 2MgO.TiO$_2$ having a low melting point of 1,732° C. increases, with the result that the liquid phase sinterabilities increase remarkably while the structural stability drops. It should be noted that in order to ensure a small pore diameter and complicated pore shape in solid solution reactions according to the above-described formulae (1)to (9), the molar ratio of titania TiO$_2$ to alumina Al$_2$O$_3$ is preferably in the range of 0.3 to 1.3, and the alumina Al$_2$O$_3$ content is preferably in the range of 1 to 15% by weight corresponding to the molar ratio of titania TiO$_2$ to alumina Al$_2$O$_3$. The presence of alumina Al$_2$O$_3$ in such an amount causes the melting point of [MgO.Al$_2$O$_3$—2MgO.TiO$_2$] s.s. to rise to the vicinity of the melting point (2,135° C.) of the magnesia-alumina spinel. If the alumina Al$_2$O$_3$ content is less than 1% by weight, the effect of a rise in the melting point cannot be achieved, and if it exceeds 15% by weight, the bricks expand by the generation of the spinel itself so that apparent porosity is likely to increase, resulting in a decrease in the corrosion resistance.

As the iron oxide, iron dioxide or red iron oxide, which are commercially available, may be used. The range of the purity is not particularly limited, but iron oxide containing not less than 90% Fe$_2$O$_3$ is preferably used. The iron oxide content is preferably in the range of 0.5 to 10% by weight, and if it is less than 0.5% by weight, the above mentioned solid solution or composite spinel will be produced in a small amount so that improvement in the hydration resistance and strength at high temperature cannot be achieved. If it exceeds 10% by weight, the iron oxide is likely to change its structure, shifting between the bivalent and trivalent forms when the bricks are in service, and as a result, the corrosion resistance and thermal spalling resistance decrease.

As the metal powder, one or more selected from the group consisting of Al, Mg, Si, Al—Mg and the like may be used. The metal powder content is preferably in time range of 1 to 10% by weight, and if it is less than 1% by weight, improvement in strength and improvement in the corrosion resistance due to the generation of the composite spinel cannot be seen. In addition, the benefits achieved by the metal powder cannot be expected. If the metal powder content exceeds 10% by weight, the metal powder reacts with SiO$_2$ and CaO contained in time bricks or slag with the result that the amount of a product having a low melting point such as CaO—Al$_2$O$_3$, CaO—MgO—SiO$_2$ or the like is likely to increase, resulting in a decrease in the corrosion resistance.

As the oxide material except for iron oxide, one or more selected from the group consisting of silica, lime, zirconia, mullite, zircon and the like may be used. The oxide material content is preferably in the range of 1 to 20% by weight, and if it is less than 1% by weight, improvement in the strength and improvement in the corrosion resistance due to the generation of the composite spinel or solid solution cannot be achieved. If it exceeds 20% by weight, the oxide material reacts with SiO$_2$ and CaO contained in the bricks or slag, which increases the amount of a product having a low melting point, resulting in a decrease in the corrosion resistance.

The type of carbon used in the chrome-free bricks of the invention is not particularly limited. For example, one or more selected from the group consisting of crystalline graphite, earthy graphite, artificial graphite, pitch coke, anthracite, carbon black, and the like may be used, but crystalline graphite having a high fixed carbon content is preferable in view of its high corrosion resistance.

When the chrome-free bricks of the invention contain carbon, its carbon content is preferably in the range of 1 to 20% by weight. If the carbon content is less than 1% by weight, the benefits achieved by carbon cannot be expected. If the carbon content exceeds 20% by weight, the strength will considerably decrease and wear due to abrasion with molten steel will be remarkable.

The clay content is preferably in the range of 0.5 to 5% by weight and if it is less than 0.5% by weight, the benefit achieved by clay, i.e., good moldability cannot be expected. On the other hand, if the clay content exceeds 5% by weight, there is a likelihood that the generation of silicate bonds having a low melting point will undesirably decrease the corrosion resistance.

The chrome-free bricks of the invention are produced as sintered bodies from the combinations of the above materials which are subjected to kneading, molding, drying at 100° to 500° C. and burning at 1,600° to 1,9000° C. Also, they are produced as unsintered bodies by kneading, molding and drying at 100° to 500° C. Note that when materials are burned, sufficient holding time is needed so that no unburned parts should be left. For kneading, molding, drying and burning, the conventional method may be used.

In kneading, an organic or inorganic binder such as phenol resin, fran resin, bittern, calcium lignosulfonate, sodium silicate, and aluminum phosphate may be added if necessary. In molding, the materials are pressurized, for example, by the use of a friction press, oil press or rubber press which will be selected in accordance with the usage of the bricks and facility for manufacturing.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

Examples of the chrome-free bricks according to the invention and Comparative Examples will be hereinafter described in detail.

EXAMPLES 1 TO 7 AND COMPARATIVE EXAMPLES 1 TO 4

An amount of 1.5% by weight of calcium lignosulfonate was added as a binder to 100% by weight of each composition containing no calcium lignosulfonate shown in Table 1. After kneading, mixtures were respectively molded into a standard shape by a friction press. Then, the molded products were dried at 120° C. for 16 hours, and for sintered bodies, dried products are burned at 1,800° C. in a tunnel kiln for 5 hours. The bricks thus obtained were used as sample bricks.

The material components used in Examples and Comparative Examples are as follows.

Magnesia material (fused product): A product produced by Tateho Chemical Industries Co., Ltd. and having a purity of 99.44% was used.

Magnesia material (sintered product): A product produced by Shin Nihon Chemical Industry Co., Ltd. and having a purity of 99.00% was used.

Magnesia-alumina spinel material (fused product/sintered product): Products produced by Naigai Ceramics Co., Ltd. and having a purity of 99.01% were used.

Dichromium trioxide powder: The product produced by Nippon Denko Co., Ltd. and having a purity of 99.06% was used.

Chromite: Turkish chromite having a purity of 52.72% was used.

Titania: Rutile-type titania was used.

The sample bricks mentioned earlier were tested in the following ways to measure their apparent specific gravity, bending strength, thermal spalling resistance, corrosion resistance, penetration resistance, and service life. Service life was measured using actual equipment. The results are shown in Table 1.

Apparent Specific Gravity:

The apparent porosity of each sample was measured by a usual refractory test in accordance with JIS R2205.

Bending Strength:

A 30×15×20 mm test piece was cut from each sample brick of standard shape and heated in an electric furnace which was maintained at 1,500° C. Then, a three-point bending test was conducted.

Thermal Spalling Resistance:

A 55×55×230 mm prismatic test piece was cut from each sample brick and placed in an electric furnace for 15 minutes, one side of the electric furnace being kept at 1,400° C. Then, the test pieces were taken out of the furnace and forcibly air-cooled at room temperature over 15 minutes. This thermal shock by the heat/cooling cycle was repeated up to 25 times. Then, thermal spalling resistance was evaluated for each sample, by counting the number of thermal shocks which had been applied until the sample flaked off. Note that the more the number of thermal shocks applied before flaking, the better thermal spalling resistance and that samples which did not flake after being subjected to 25 cycles are marked with 25+ in Table 1.

Corrosion Resistance and Penetration Resistance:

A plurality of test pieces in the form of trapezoidal prism were cut from each sample brick and a drum was lined with these test pieces. While the drum being rotated, a flame generated by oxygen and propane was blown into the drum in the axial direction thereof, thereby heating the drum to 1,700° C. Then, steel and slag ($CaO/SiO_2$ ratio is 3:1) were charged into the drum in the ratio of 6:4 as eroding agents, while the furnace was kept at 1,700° C., and erosion was allowed for 30 minutes. After eliminating the eroding agents, forcible air-cooling was carried out for 20 minutes with pressurized air. The cycle from heating by gas flame to forcible air-cooling was repeated 5 times. Thereafter, the test pieces were cut, and the corrosion resistance and penetration resistance of each sample were obtained by evaluating the average corrosion loss and the mean depth of slag penetration of the parts of the test pieces. Note that the corrosion loss of each sample is represented by an index number with the corrosion loss of Comparative Example 1 being 100 and depths of slag penetration are in mm in Tables 1 to 4.

Test conducted using actual equipment:

Bricks were produced into such a shape to fit to an actual furnace and a 250tRH-type vacuum degasset was lined with these bricks at its lower vessel which is most susceptible to damage. After use, estimated service life (heat) was measured from the sizes of the remaining bricks of Comparative Example 1 and Examples 2 and 5, based on the corrosion rate (mm/heat).

TABLE 1

| EXAMPLE OF THE INVENTION AND COMPARATIVE EXAMPLES: | | | | | | | | | | | |
|---|---|---|---|---|---|---|---|---|---|---|---|
| | EXAMPLES OF THE INVENTION | | | | | | | COMPARATIVE EXAMPLES | | | |
| | 1 | 2 | 3 | 4 | 5 | 6 | 7 | 1 | 2 | 3 | 4 |
| COMPOSITION wt % | | | | | | | | | | | |
| MAGNESIA MATERIAL (FUSED) | | | | 92 | 45 | 40 | 40 | 40 | 40 | 99 | 73 |
| MAGNESIA MATERIAL (SINTERED) | 98 | 92 | 75 | | 45 | 49 | 45 | | 44 | | |
| CHROMITE (TURKISH CHROMITE) | | | | | | | | 55 | | | |
| DICHROMIUM TRIOXIDE POWDER | | | | | | | | 5 | | | |
| ALUMINA (50 TO 0.1 μm) | 1 | 5 | 15 | 5 | 5 | 5 | 5 | | 5 | 0.5 | 16 |
| TITANIA (1 TO 0.01 μm) | 1 | 3 | 10 | 3 | 5 | 5 | 5 | | 5 | 0.5 | 11 |
| CLAY | | | | | | 1 | 5 | | 6 | | |
| CALCIUM LIGNOSULFONATE | (1.5) | (1.5) | (1.5) | (1.5) | (1.5) | (1.5) | (1.5) | (1.5) | (1.5) | (1.5) | (1.5) |

TABLE 1-continued

EXAMPLE OF THE INVENTION AND COMPARATIVE EXAMPLES:

| | EXAMPLES OF THE INVENTION | | | | | | | COMPARATIVE EXAMPLES | | | |
|---|---|---|---|---|---|---|---|---|---|---|---|
| | 1 | 2 | 3 | 4 | 5 | 6 | 7 | 1 | 2 | 3 | 4 |
| TEST | | | | | | | | | | | |
| APPARENT POROSITY (%) | 15.9 | 13.9 | 14.7 | 14.6 | 14.0 | 16.5 | 15.1 | 17.6 | 12.6 | 16.6 | 15.8 |
| BENDING STRENGTH (kg/cm$^2$) AT 1500° C. | 34 | 45 | 57 | 46 | 49 | 55 | 40 | 40 | 36 | 29 | 45 |
| THERMAL SPALLING RESISTANCE | 25+ | 25+ | 25+ | 25+ | 25+ | 25+ | 25+ | 25+ | 22 | 20 | 25+ |
| CORROSION RESISTANCE INDEX (%) | 80 | 72 | 80 | 53 | 65 | 65 | 88 | 100 | 116 | 97 | 123 |
| DEPTH OF SLAG PERMEATION (mm) | 4 | 2 | 3 | 2 | 1 | 1 | 2 | 13 | 9 | 8 | 6 |
| SERVICE LIFE MEASURED WITH ACTUAL EQUIPMENT (heat) | | 413 | | | 446 | | | 325 | | | |
| EVALUATION BY THE USE OF CEMENT KILN | | | | | | | | | | | |
| THICKNESS OF COATING LAYER (mm) | | | | | | 22 | | 15 | | | |
| SPALLING | | | | | | NO | | YES | | | |

NOTES:
1. In each composition, the value in parenthesis is expressed by wt % per 100 wt % composition containing no calcium lignosulfonate.
2. The blanks in the column of "SERVICE LIFE TEST" indicate that no test was conducted.

The following facts will be obtained from Table 1.

(1) The chrome-free bricks according to Examples 1 to 7 of the invention exhibit higher corrosion resistance than the conventional magnesia-chrome brick (Comparative Example 1) which is presently used in RH-type vacuum degassers, irrespective of whether fused magnesia, sintered magnesia or a combination of them is used as an aggregate. Particularly, the chrome-free brick containing fused magnesia (Example 4) has a markedly improved corrosion resistance.

(2) The preferred titania $TiO_2$ content and alumina $Al_2O_3$ content are 1 to 10% by weight and 1 to 15% by weight, respectively.

(3) The preferred clay content is 5% by weight or less.

EXAMPLES 8 TO 16 AND COMPARATIVE EXAMPLES 5 TO 6

Sample bricks having different compositions shown in Table 2 were prepared like Example 1. Then, the apparent specific gravity, bending strength, thermal spalling resistance, corrosion resistance, penetration resistance and service life (measured by actual equipment) of each sample brick were measured in the same way as described in Example 1. The results are shown in Table 2.

TABLE 2

EXAMPLES OF THE INVENTION AND COMPARATIVE EXAMPLES:

| | EXAMPLES OF THE INVENTION | | | | | | | | | COMPARATIVE EXAMPLES | |
|---|---|---|---|---|---|---|---|---|---|---|---|
| | 8 | 9 | 10 | 11 | 12 | 13 | 14 | 15 | 16 | 5 | 6 |
| COMPOSITION wt % | | | | | | | | | | | |
| MAGNESIA MATERIAL (FUSED) | | | | | | | | 43 | 43 | | |
| MAGNESIA MATERIAL (SINTERED) | | | | | 10 | 40 | 82 | | | | |
| MAGNESIA-ALUMINA SPINEL MATERIAL (FUSED) | | | | 88 | | | | 43 | | 99 | 71 |
| MAGNESIA-ALUMINA SPINEL MATERIAL (SINTERED) | 96 | 88 | 75 | | 82 | 52 | 10 | | 43 | | |
| ALUMINA (50 TO 0.1 μm) | 1 | 7 | 15 | 7 | 5 | 5 | 5 | 8 | 8 | 0.5 | 17 |
| TITANIA (1 TO 0.01 μm) | 1 | 5 | 10 | 5 | 3 | 3 | 3 | 4 | 4 | 0.5 | 12 |
| CLAY | | | | | | | | 2 | 2 | | |
| CALCIUM LIGNOSULFONATE | (1.5) | (1.5) | (1.5) | (1.5) | (1.5) | (1.5) | (1.5) | (1.5) | (1.5) | (1.5) | (1.5) |
| TEST | | | | | | | | | | | |
| APPARENT POROSITY (%) | 13.1 | 14.2 | 15.5 | 14.4 | 13.8 | 13.6 | 13.2 | 13.6 | 13.4 | 18.5 | 17.7 |
| BENDING STRENGTH (kg/cm$^2$) AT 1500° C. | 26 | 30 | 22 | 28 | 32 | 39 | 40 | 32 | 35 | 60 | 25 |
| THERMAL SPALLING RESISTANCE | 25+ | 25+ | 25+ | 25+ | 25+ | 25+ | 25+ | 25+ | 25+ | 16 | 20 |
| CORROSION RESISTANCE INDEX (%) | 90 | 87 | 90 | 85 | 85 | 83 | 89 | 82 | 82 | 104 | 109 |
| DEPTH OF SLAG PERMEATION (mm) | 5 | 4 | 4 | 3 | 3 | 3 | 2 | 2 | 2 | 13 | 15 |
| SERVICE LIFE MEASURED WITH ACTUAL EQUIPMENT (heat) | | | 405 | | | 425 | | 466 | | 320 | |
| EVALUATION BY THE USE OF CEMENT KILN | | | | | | | | | | | |
| THICKNESS OF COATING LAYER (mm) | | | | | | 25 | | | | | |
| SPALLING | | | | | | NO | | | | | |

NOTES:
1. In each composition, the value in parenthesis is expressed by wt % per 100 wt % total materials.
2. In blanks in the column of "SERVICE LIFE TEST" indicate that no test was conducted.

The following facts will be obtained from Tables 1 and 2.

(1) The bricks (Examples 8 to 16) in which a magnesia-alumina spinel is used as an aggregate exhibit higher corrosion resistance than the conventional magnesia-chrome brick (Comparative Example 1 ), but exhibit lower bending strength and slightly lower corrosion resistance than the bricks (Examples 1 to 7) in which only a magnesia material is used.

(2) The use of a combination of a magnesia-alumina spinel and a magnesia material increases corrosion resistance slightly, as compared with the case where a magnesia-alumina spinel is used alone.

(3) The desirable titania $TiO_2$ content and alumina $Al_2O_3$ content are 1 to 10% by weight and 1 to 15% by weight, respectively.

EXAMPLES 17 TO 24 AND COMPARATIVE EXAMPLES 7 AND 8

Sample bricks having different compositions shown in Table 3 were prepared like Example 1. Then, the apparent specific gravity, bending strength, thermal spalling resistance, corrosion resistance, penetration resistance, service life (measured by actual equipment), and hydration resistance of each sample brick were measured in the same way as described in Example 1. The results are shown in Table 3.

Iron oxide ($Fe_2O_3$) having a purity of 98.16% by weight was used. The hydration resistance of each sample was measured in the following way.

Hydration resistance:

The sample bricks were heated at 120° C. over 40 hours in an atmosphere of steam (Autoclave method) and the hydration resistance of each sample was measured by evaluating a change in its weight (wt %).

TABLE 3

EXAMPLES OF THE INVENTION AND COMPARATIVE EXAMPLES:

| | EXAMPLES OF THE INVENTION | | | | | | | | COMPARATIVE EXAMPLES | |
| --- | --- | --- | --- | --- | --- | --- | --- | --- | --- | --- |
| | 17 | 18 | 19 | 20 | 21 | 22 | 23 | 24 | 7 | 8 |
| COMPOSITION wt % | | | | | | | | | | |
| MAGNESIA MATERIAL (FUSED) | | | | | | 50 | | | | |
| MAGNESIA MATERIAL (SINTERED) | 89.5 | 87 | 85 | 80 | | 35 | | 33 | 89.8 | 78 |
| MAGNESIA-ALUMINA SPINEL MATERIAL (FUSED) | | | | | | | 50 | 50 | | |
| MAGNESIA-ALUMINA SPINEL MATERIAL (SINTERED) | | | | | 87 | | 37 | | | |
| ALUMINA (50 TO 0.1 μm) | 7 | 7 | 7 | 7 | 7 | 7 | 7 | 7 | 7 | 7 |
| TITANIA (1 TO 0.01 μm) | 3 | 3 | 3 | 3 | 3 | 3 | 3 | 5 | 3 | 3 |
| IRON OXIDE (50 TO 0.1 μm) | 0.5 | 3 | 5 | 10 | 3 | 3 | 3 | 5 | 0.2 | 12 |
| CLAY | | | | | | 2 | | | | |
| CALCIUM LIGNOSULFONATE | (1.5) | (1.5) | (1.5) | (1.5) | (1.5) | (1.5) | (1.5) | (1.5) | (1.5) | (1.5) |
| TEST | | | | | | | | | | |
| APPARENT POROSITY (%) | 15.2 | 14.7 | 15.1 | 15.7 | 15.0 | 14.7 | 14.5 | 14.6 | 15.4 | 15.9 |
| BENDING STRENGTH (kg/cm²) AT 1500° C. | 53 | 59 | 75 | 70 | 45 | 65 | 50 | 55 | 42 | 82 |
| THERMAL SPALLING RESISTANCE | 25+ | 25+ | 25+ | 25+ | 25+ | 25+ | 25+ | 25+ | 25+ | 13 |
| CORROSION RESISTANCE INDEX (%) | 78 | 74 | 70 | 75 | 78 | 60 | 77 | 76 | 84 | 95 |
| DEPTH OF SLAG PENETRATION (mm) | 3 | 2 | 1 | 2 | 2 | 2 | 2 | 2 | 5 | 7 |
| INCREASE IN WEIGHT DUE TO HYDRATION (wt %) | 0.41 | 0.26 | 0.20 | 0.17 | 0.25 | 0.26 | 0.26 | 0.20 | 0.93 | 0.16 |
| SERVICE LIFE MEASURED WITH ACTUAL EQUIPMENT (heat) | | 419 | | | | | 370 | | 320 | 180 |
| EVALUATION BY THE USE OF CEMENT KILN | | | | | | | | | | |
| THICKNESS OF COATING LAYER (mm) | | 21 | | | | | | 22 | | |
| SPALLING | | NO | | | | | | NO | | |

NOTES:
1. In each composition, the value in parenthesis is expressed by wt % per. 100 wt % total materials.
2. The blanks in the column of "SERVICE LIFE TEST" indicate that no test was conducted.

The following facts will be obtained from Table 3.

(1) The presence of iron oxide increases bending strength and corrosion resistance. Hydration resistance is also increased by adding iron oxide (i.e., the rate of weight increased by hydration drops).

(2) The preferred iron oxide content is 0.5 to 10% by weight.

EXAMPLES 25 TO 36, 3', 6', 10', 15' AND COMPARATIVE EXAMPLES 9 TO 13

Unburned sample bricks having different compositions shown in Table 4 were prepared in the same way as Example 1 except that 1.5 to 3.3% by weight of phenol resin was added to 100% by weight of each composition containing no phenol resin instead of calcium lignosulfonate. Then, the apparent specific gravity, bending strength, thermal spalling resistance, corrosion resistance, penetration resistance, and service life (measured by actual equipment) of each sample brick were measured in the same way as described in Example 1. The results are shown in Table 4. It should be noted that the sample bricks of Examples 3', 6', 10' and 15' have the same compositions of Examples 3, 6, 10, 15, respectively and were prepared without burning in a cement kiln. The same measurements were conducted on the sample bricks of Examples 3', 6', 10' and 15'.

TABLE 4

EXAMPLES OF THE INVENTION AND COMPARATIVE EXAMPLES:

| | EXAMPLES OF THE INVENTION | | | | | | | | | |
|---|---|---|---|---|---|---|---|---|---|---|
| | 25 | 26 | 27 | 28 | 29 | 30 | 31 | 32 | 33 | 34 |
| COMPOSITION wt % | | | | | | | | | | |
| MAGNESIA MATERIAL (FUSED) | | | | | | | | 30 | | |
| MAGNESIA MATERIAL (SINTERED) | | | | 30 | | | | | 35 | 40 |
| MAGNESIA-ALUMINA SPINEL MATERIAL (FUSED) | | | | | | | | 53 | | |
| MAGNESIA-ALUMINA SPINEL MATERIAL (SINTERED) | 87 | 78 | 68 | 48 | 87 | 83 | 78 | | 40 | 47 |
| ALUMINA (50 TO 0.1 μm) | 7 | 7 | 7 | 7 | 7 | 7 | 7 | 7 | 5 | 5 |
| TITANIA (1 TO 0.01 μm) | 5 | 5 | 5 | 5 | 5 | 5 | 5 | 5 | 3 | 3 |
| CRYSTALLINE GRAPHITE | 1 | 10 | 20 | 10 | | | | | 15 | |
| METAL Al | | | | | 1 | 5 | 10 | 5 | 2 | |
| IRON OXIDE (50 TO 0.1 μm) | | | | | | | | | | 5 |
| ZIRCONIA | | | | | | | | | | |
| CLAY | | | | | | | | | | |
| PHENOL RESIN | (1.5) | (2.0) | (3.0) | (2.0) | (1.5) | (1.5) | (1.5) | (1.5) | (2.5) | (1.5) |
| TEST | | | | | | | | | | |
| APPARENT POROSITY (%) | 4.0 | 3.2 | 2.9 | 3.0 | 6.2 | 5.7 | 5.0 | 5.5 | 3.0 | 6.2 |
| BENDING STRENGTH (kg/cm$^2$) at 1500° C. | 55 | 60 | 40 | 62 | 72 | 88 | 95 | 90 | 67 | 80 |
| THERMAL SPALLING RESISTANCE | 25+ | 25+ | 25+ | 25+ | 25+ | 25+ | 25+ | 25+ | 25+ | 25+ |
| CORROSION RESISTANCE INDEX (%) | 95 | 90 | 85 | 88 | 96 | 93 | 91 | 93 | 87 | 92 |
| DEPTH OF SLAG PERMEATION (mm) | 1 | 1 | 1 | 1 | 7 | 8 | 9 | 5 | 1 | 4 |
| SERVICE LIFE MEASURED WITH ACTUAL EQUIPMENT (heat) | | 335 | | | | 336 | | | | |
| EVALUATION BY THE USE OF CEMENT KILN | | | | | | | | | | |
| THICKNESS OF COATING LAYER (mm) | | 17 | | | | 18 | | | | |
| SPALLING | | NO | | | | NO | | | | |

| | EXAMPLES OF THE INVENTION | | | | | | COMPARATIVE EXAMPLES | | | | |
|---|---|---|---|---|---|---|---|---|---|---|---|
| | 35 | 36 | 3' | 6' | 10' | 15' | 9 | 10 | 11 | 12 | 13 |
| COMPOSITION wt % | | | | | | | | | | | |
| MAGNESIA MATERIAL (FUSED) | | | | 40 | | 43 | | | | | |
| MAGNESIA MATERIAL (SINTERED) | 40 | 50 | 75 | 49 | | | | | | | 40 |
| MAGNESIA-ALUMINA SPINEL MATERIAL (FUSED) | | | | | | 43 | | | | | |
| MAGNESIA-ALUMINA SPINEL MATERIAL (SINTERED) | 47 | 22 | | | 75 | | 87.5 | 66 | 87.5 | 76 | 16 |
| ALUMINA (50 TO 0.1 μm) | 5 | 5 | 15 | 5 | 15 | 8 | 7 | 7 | 7 | 7 | 5 |
| TITANIA (1 TO 0.01 μm) | 3 | 3 | 10 | 5 | 10 | 4 | 5 | 5 | 5 | 5 | 3 |
| CRYSTALLINE GRAPHITE | | 10 | | | | | 0.5 | 22 | | | 22 |
| METAL Al | | 2 | | | | | | | 0.5 | 12 | 12 |
| IRON OXIDE (50 TO 0.1 μm) | | | | | | | | | | | |
| ZIRCONIA | 5 | 5 | | | | | | | | | |
| CLAY | | 3 | | 1 | | 2 | | | | | 2 |
| PHENOL RESIN | (1.5) | (2.0) | (1.5) | (2.0) | (1.5) | (2.0) | (1.5) | (3.3) | (1.5) | (1.5) | (3.3) |
| TEST | | | | | | | | | | | |
| APPARENT POROSITY (%) | 6.0 | 3.0 | 3.5 | 4.0 | 3.2 | 3.7 | 4.9 | 2.7 | 6.5 | 4.9 | 2.5 |
| BENDING STRENGTH (kg/cm$^2$) at 1500° C. | 75 | 80 | 50 | 59 | 47 | 63 | 49 | 30 | 68 | 98 | 100 |
| THERMAL SPALLING RESISTANCE | 25+ | 25+ | 25+ | 25+ | 25+ | 25+ | 23 | 25+ | 23 | 20 | 19 |
| CORROSION RESISTANCE INDEX (%) | 90 | 82 | 92 | 90 | 96 | 92 | 99 | 103 | 99 | 110 | 116 |
| DEPTH OF SLAG PERMEATION (mm) | 4 | 1 | 4 | 3 | 6 | 3 | 3 | 1 | 10 | 13 | 1 |
| SERVICE LIFE MEASURED WITH ACTUAL EQUIPMENT (heat) | | 349 | | 340 | | | | 299 | | | |
| EVALUATION BY THE USE OF CEMENT KILN | | | | | | | | | | | |
| THICKNESS OF COATING LAYER (mm) | | | | 13 | | 15 | | | | | |
| SPALLING | | | | NO | | NO | | | | | |

NOTES:
1. In each composition, the value in parenthesis is expressed by wt % per 100 wt % containing no phenol resin.
2. The blanks in the column of "SERVICE LIFE TEST" indicate that no test was conducted.

The following facts will be obtained from Table 4.

(1) The use of carbon increases corrosion resistance, but if carbon content exceeds 20% by weight, corrosion resistance and strength will decrease.

(2) The use of aluminum powder as the metal powder increases corrosion resistance, but if aluminum powder content exceeds 10% by weight, the brick will be brittle and thermal spalling resistance will decrease.

(3) When iron oxide, carbon, aluminum powder (used as the metal powder), or zirconia (used as the oxide material) alone is used, or when a combination of them is used, corrosion resistance increases.

(4) Even when the brick contains iron oxide, carbon, metal powder or an oxide material, a magnesia-alumina spinel and a magnesia material can be used in combination.

(5) The chrome-free bricks of the invention may be sintered bodies or unsintered bodies.

EXAMPLES 37 TO 40 AND COMPARATIVE EXAMPLES 14 TO 18

An amount of 1.5% by weight of calcium lignosulfonate was added as a binder to 100% by weight of each composition containing no calcium lignosulfonate shown in Table 5, and they were kneaded, dried and burned like Example 1 to obtain sample bricks. Then, the apparent specific gravity, bending strength, thermal spalling resistance, corrosion resistance, and service life (measured by actual equipment) of each sample brick were measured in the same way as described in Example 1. The results are shown in Table 5.

Although the service life test was conducted in the lower vessel of an RH-type vacuum degasset in Examples and Comparative Examples, the same effect can be achieved by steel vessels (such as DH-type vacuum degassers and AOD furnaces) and fusion furnaces.

Tables 1 to 4 also show the results of a test in which the effect of the chrome-free bricks of the invention was tested in a cement rotary kiln. In this test, the burning zone of a cement rotary kiln having a diameter of 4.2 m and length of 79 m was divided into parts and these parts were respectively lined with each chrome-free brick of the invention and the magnesia-chrome brick of Comparative Example 1. After 6 months had elapsed, the bricks in the cement rotary kiln were checked and the results are as shown in Tables 1 to 4. As understood from Tables 1 to 4, spalling was not seen in the chrome-free bricks of the invention and the coating layer of each chrome-free brick was thicker than that of the magnesia-chrome brick of Comparative Example 1, so that replacement was not needed in the case of the chrome-free bricks. The reason for the thick coating layer cannot be asserted, but it is assumed that the coating layer is thickened

TABLE 5

EXAMPLES OF THE INVENTION AND COMPARATIVE EXAMPLES:

| | EXAMPLES OF THE INVENTION | | | | COMPARATIVE EXAMPLES | | | | |
|---|---|---|---|---|---|---|---|---|---|
| | 37 | 38 | 39 | 40 | 14 | 15 | 16 | 17 | 18 |
| COMPOSITION wt % | | | | | | | | | |
| MAGNESIA MATERIAL (FUSED) | 96 | 92 | 75 | 52 | 40 | 99 | 73 | 95.5 | 39 |
| MAGNESIA MATERIAL (SINTERED) | | | | 40 | | | | | |
| CHROMITE (TURKISH CHROMITE) | | | | | 55 | | | | |
| DICHROMIUM TRIOXIDE POWDER | | | | | 5 | | | 0.5 | 32 |
| ALUMINA (50 TO 0.1 μm) | 2 | 5 | 15 | 5 | | 0.5 | 16 | 2 | 17 |
| TITANIA (1 TO 0.01 μm) | 2 | 3 | 10 | 3 | | 0.5 | 11 | 2 | 12 |
| CALCIUM LIGNOSULFONATE | (1.5) | (1.5) | (1.5) | (1.5) | (1.5) | (1.5) | (1.5) | (1.5) | (1.5) |
| TEST | | | | | | | | | |
| APPARENT POROSITY (%) | 17.0 | 15.5 | 15.0 | 15.1 | 17.6 | 17.6 | 14.8 | 17.0 | 17.0 |
| BENDING STRENGTH (kg/cm²) at 1500° C. | 63 | 75 | 80 | 80 | 60 | 53 | 45 | 62 | 26 |
| THERMAL SPALLING RESISTANCE | 25+ | 25+ | 25+ | 25+ | 25+ | 20 | 25+ | 25+ | 10 |
| CORROSION RESISTANCE INDEX (%) | 57 | 55 | 86 | 63 | 100 | 97 | 123 | 79 | 156 |
| SERVICE LIFE MEASURED WITH ACTUAL EQUIPMENT (heat) | | 413 | | | 325 | | | 335 | |

NOTES:
1. In each composition, the value in parenthesis is expressed by wt % per 100 wt % total materials.
2. The blanks in the column of "SERVICE LIFE TEST" indicate that no test was conducted.

The following facts will be obtained from Table 5.

(1) The chrome-free bricks of the invention exhibit good corrosion resistance, although they do not contain chrome.

(2) The preferred titania $TiO_2$ content is 10% by weight or less and the preferred alumina $Al_2O_3$ content 15% by weight or less. If titania content and alumina content exceed 10% by weight and 15% by weight respectively, or if these contents are much less than their preferred values, good corrosion resistance cannot be achieved.

The above Examples and Comparative Examples will be described below.

It was found from the service life test using actual equipment that, the conventional brick of Comparative Example 1 has 325 heats, while the chrome-free bricks of the invention have 335 to 466 heats irrespective of whether the bricks were burned or not burned. That is, the durability of the bricks of the invention is 1.03 to 1.43 times that of the brick of Comparative Example 1.

because CaO contained in the cement reacts with titania $TiO_2$ contained in the bricks according to the reaction $$CaO + TiO_2 \rightarrow CaO.TiO_2$$

so that $CaO.TiO_2$ (perovskite) is produced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chrome-free brick prepared by combining and, optionally, burning a composition comprising a major amount of at least one of a magnesia material and a magnesia-alumina spinel material; 1 to 10% by weight of titania; and 1 to 15% by weight of alumina; provided that the ratio of titania to alumina is 0.3 to 1.3; such that a solid solution of $MgO.Al_2O_3$—$2MgO.TiO_2$ is formed on at least the surface of at least one of the magnesia material and magnesia-alumina spinel material.

2. A chrome-free brick as set forth in claim 1, wherein the composition further comprises 0.5 to 10% by weight of iron oxide.

3. A chrome-free brick as set forth in claim 1, wherein the composition further comprises at least one material of the group consisting of 1 to 10% by weight of metal powder, 1 to 20% by weight of carbon and 1 to 20% by weight of one of oxide materials except for iron oxide.

4. A chrome-free brick as set forth in claim 1, wherein the composition further comprises 0.5 to 5% by weight of clay.

5. A chrome-free brick as set forth in claim 2, wherein the composition further comprises at least one material of the group consisting of 1 to 10% by weight of metal powder, 1 to 20% by weight of carbon and 1 to 20% by weight of one of oxide materials except for iron oxide.

6. A chrome-free brick as set forth in claim 2, wherein the composition further comprises 0.5 to 5% by weight of clay.

7. A chrome-free brick as set forth in claim 3, wherein the composition further comprising 0.5 to 5% by weight of clay.

8. A chrome-free brick as set forth in claim 5, wherein the composition further comprises 0.5 to 5% by weight of clay.

9. A chrome-free brick as set forth in any one of claim 1, in which the chrome-free brick is a sintered body.

10. A chrome-free brick as set forth in claim 1, in which the chrome-free brick is an unsintered body.

11. The chrome-free brick of claim 1, which further contains a solid solution of $Al_2O_3.TiO_2$—$MgO.2TiO_2$.

12. The chrome-free brick of claim 1, wherein the at least one of magnesia material and magnesia-alumina spinel material has a purity of 95% or more.

13. The chrome-free brick of claim 1, wherein the titania is in the rutile form.

14. The chrome-free brick of claim 3, wherein the composition comprises 1–10% by weight of a metal powder selected from the group consisting of Al, Mg, Si and Al—Mg.

15. The chrome-free brick of claim 3, wherein the composition comprises 1–20% by weight of an oxide selected from the group consisting of silica, lime, zirconia, mullite and zircon.

16. The chrome-free brick of claim 3, wherein the composition comprises 1–20% by weight of carbon selected from the group consisting of crystalline graphite, earthy graphite, artificial graphite, pitch coke, anthracite and carbon black.

17. The chrome-free brick of claim 9, wherein the sintering is conducted by burning at 1600° C. to 1900° C.

18. The chrome-free brick of claim 1, wherein the composition is kneaded, molded and dried at 100° C. to 500° C.

* * * * *